Aug. 8, 1967  G. B. LOUGHERY, 3RD., ET AL  3,335,368
METHOD AND APPARATUS FOR HIGH FREQUENCY MEASUREMENT OF
THE REAL PART OF A COMPLEX IMPEDANCE
Filed March 24, 1964

INVENTORS
G.B. LOUGHERY III
L.J. MONTONE
By M. Pfeffer
ATTORNEY

United States Patent Office 3,335,368
Patented Aug. 8, 1967

3,335,368
METHOD AND APPARATUS FOR HIGH FREQUENCY MEASUREMENT OF THE REAL PART OF A COMPLEX IMPEDANCE
George B. Loughery 3rd, Laureldale, and Liber J. Montone, Reading, Pa., assignors to Western Electric Company, Incorporated, New York, N.Y., a corporation of New York
Filed Mar. 24, 1964, Ser. No. 354,469
9 Claims. (Cl. 324—158)

This invention relates to the high frequency measurement of impedance, and more particularly, to the high frequency measurement of a pure resistance or of the real part of a complex impedance.

Heretofore, the high frequency measurement of impedances has generally been performed with complex equipments, which required numerous manipulative adjustments and, in many instances, calculations to accomplish a measurement. Further, the measurement time, as well as the accuracy of the measurement, has depended to a large extent on operator proficiency. Accordingly, while the heretofore employed equipments have proven to be satisfactory for laboratory use and for small scale production testing, they have proven to be grossly inadequate for high scale production testing. The present invention, on the other hand, provides methods and apparatus whereby impedance measurements at a high frequency can be performed simply, rapidly and with a reasonably high degree of accuracy and repeatability.

It is, therefore, an object of this invention to provide new and improved methods of and apparatus for measuring impedance at a high frequency.

It is another object of this invention to provide new and improved methods of and apparatus for measuring at a high frequency a pure resistance or the real part of a complex impedance.

A method of measuring an unknown impedance at a high frequency, illustrating certain features of the invention, may include the steps of applying a high frequency signal to a transmission line having a tuning stub connected thereto, terminating the transmission line successively with first and second known calibrating impedances and with the unknown impedance, adjusting the tuning stub when one of the calibrating impedances terminates the transmission line to substantially cancel the imaginary part of said one calibrating impedance, applying the voltage from a point along the transmission line of maximum voltage to variable voltage changing means, and adjusting the voltage changing means such that when the transmission line is terminated with the first and second calibrating impedances the output thereof has a predetermined relationship to the values of said calibrating impedances and when the transmission line is terminated with the unknown impedance the output of said voltage changing means has the same predetermined relationship to the value of the unknown impedance.

In accordance with various features of the invention, the real part of $h_{ie}$ of a transistor is measured at high frequency by applying a signal to a transmission line which is successively terminated by a first and second calibrating impedance and with the transistor, the transistor being suitably biased for $h_{ie}$ measurement when it terminates the line. The voltage from a point of maximum voltage along the transmission line is applied to variable voltage changing means which is adjusted such that when the transmission line is terminated with the first and second calibrating impedances the output thereof has a predetermined relationship to the values of said calibrating impedances, and when the transmission line is terminated with the transistor the output of said voltage changing means has the same predetermined relationship to the value of the transistor.

Apparatus for the high frequency measurement of a transistor illustrating certain features of the invention may include a transmission line having a source of high frequency electrical energy connected to it at one end. Means connected to the transmission line at its opposite end are provided for receiving a transistor to be measured and for terminating the transmission line therewith. The transistor is suitably biased for $h_{ie}$ measurement. Means coupled to the transmission line at a point of maximum standing wave voltage are provided for detecting this voltage and for applying the same to voltage changing means, which latter means are adjustable to cause the output thereof to have a predetermined relationship to the value of a transistor terminating the transmission line.

Other features of the invention include apparatus for determining whether the real part of an impedance is greater than or less than a predetermined value. This is accomplished with a transmission line, a source of high frequency electrical energy connected to said transmission line at one end thereof, a receptacle connected to the opposite end of the transmission line for receiving an impedance to be measured and for terminating the transmission line therewith, a readout stub connected to said transmission line at a point of maximum standing wave voltage, means for detecting voltage connected to the readout stub at substantially a point of maximum standing wave voltage, a tuning stub connected to the readout stub intermediate the input end thereof and the detecting means, adjustable voltage divider means for causing the output thereof in voltage units to be equal numerically to the real part in impedance units of an impedance terminating the transmission line, an adjustable source of reference voltage such that the output thereof, in voltage units, is equal numerically to the predetermined value of the real part of the unknown impedance, in impedance units, and means for comparing the output of the voltage divider to the output of the reference voltage source.

A complete understanding of the invention may be had from the following detailed description of specific embodiments thereof, when read in conjunction with the appended drawings, in which.

Figure 1:
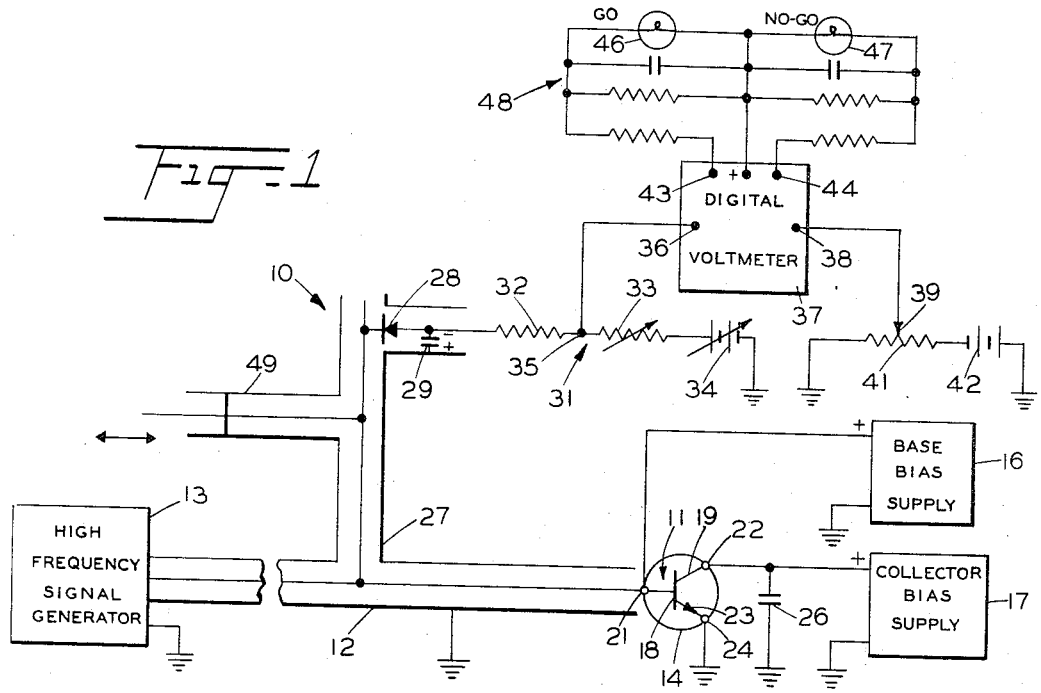
FIG. 1 illustrates schematically an embodiment of the invention.

Referring now to the drawings and, particularly to FIG. 1, there is illustrated therein apparatus 10 for the high frequency measurement of a pure resistance or the real part of a complex impedance, such as $h_{ie}$ of a transistor 11. The quantity $h_{ie}$ can be defined as the small signal, A.C. input impedance of a transistor connected in the common emitter mode and having the output thereof A.C. short-circuited.

In the following description it will be assumed that at the measurement frequency, $h_{ie}$ of the transistor 11 can be represented as a resistor ($REh_{ie}$) in series with a capacitive reactance. Moreover, it will be assumed that at the measurement frequency, $REh_{ie}$ is substantially greater than the reactive component of $h_{ie}$.

The apparatus 10 includes an essentially lossless, coaxial transmission line 12 having a high frequency signal generator 13 connected to it at one end and a test receptacle 14, adapted to receive the transistor 11, connected to it at its opposite end. To suitably bias the transistor 11, which as seen is connected in the common emitter mode, D.C. voltage sources 16 and 17 are connected to the base 18 and collector 19 of the transistor, respectively, through corresponding terminals 21 and 22 of the receptacle 14. The transistor emitter 23 is grounded through terminal 24 of the receptacle, and a capacitor 26 is connected from the collector terminal 22 to ground to A.C. short circuit the output of the transistor 11 at the measurement frequency. As is readily appreciated, by virtue of the foregoing connections the transistor 11 has been conditioned for an $h_{ie}$ measurement.

At a point one half wavelength from the base 18 of the transistor 11, a half wavelength, open-circuited stub 27, hereinafter referred to as "the readout stub 27," is connected to the transmission line 12. Since the voltage at any point in a lossless transmission line repeats itself every half wavelength, and a half wavelength open-circuited stub presents an open circuit to a transmission line at its point of connection thereto, the voltage at the input end of the readout stub 27, as well as the voltage at the open circuited end thereof, is equal to the voltage at the base 18 of the transistor 11. The voltage at the open-circuited end is detected by means of a diode detector 28 which rectifies the voltage and applies the rectified voltage to a capacitor 29, the capacitor charging to the peak value of the rectifier voltage with the polarities indicated in FIG. 1. The capacitor voltage, in turn, is applied to a voltage divider 31 which includes a fixed resistor 32, a variable resistor 33 and a variable D.C. voltage source 34.

Advantageously, the output 35 of the voltage divider is applied to one input 36 of a conventional voltage measuring device, such as a digital voltmeter 37, the other input 38 of the digital voltmeter being connected to a point 39 of reference potential which is derived from the parallel combination of a potentiometer 41 and a D.C. voltage source 42. Accordingly, the voltage measured by the voltmeter 37 is the difference between the voltage at the output 35 of voltage divider 31 and the potential of the reference point 39. One digital voltmeter which has been successfully used with the apparatus 10 is a Dymec Model 2401A. This voltmeter, besides providing a visual indication of the voltage measured thereby, has the added feature of completing an energizing circuit at an output terminal 43 if the voltage at the input terminal 36 is less than that at the input terminal 38 and completing an energizing circuit at an output terminal 44 if the voltage at the input terminal 36 is greater than that at the input terminal 38. Thus, by connecting a pair of lamps 46 and 47 to the terminals 43 and 44, respectively, through a suitable coupling circuit 48, Go-No Go operation of the apparatus 10, as well as direct readout is readily effected. It will, of course, be appreciated that other types of measuring and indicating equipment may be employed.

A short-circuited, tuning stub 49 of adjustable length is connected to the readout stub 27 at a point intermediate the ends thereof. The function of the tuning stub 49, as will be explained in more detail below, is to effectively tune out or cancel the reactive component of $h_{ie}$ as well as any stray reactance that appears at the terminal 21 of the receptacle 14.

Figure 2:
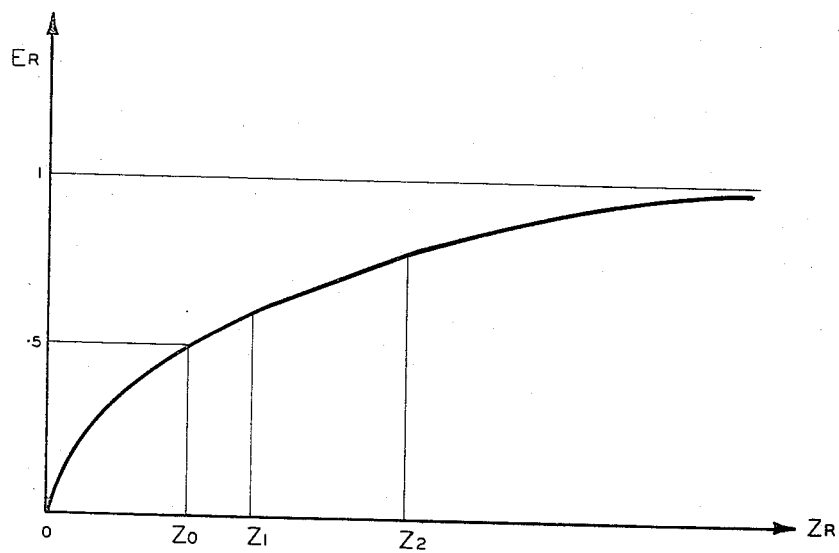
FIG. 2 is a graph illustrating normalized receiving end voltage as a function of receiving end impedance for a transmission line.

Prior to proceeding to a description of the operation of the apparatus 10, reference should be made to FIG. 2 which depicts graphically the relationship between the normalized voltage at the receiving end of a transmission line and the receiving end impedance (taken to be a pure resistance in the curve of FIG. 2). In accordance with well known transmission line theory, the curve of FIG. 2 can be derived from the following relationship:

$$E_R = \frac{1}{2}\left[1 + \frac{Z_R - Z_0}{Z_R + Z_0}\right]$$

where $E_R$ is the normalized receiving end voltage, i.e., $$\frac{E \text{ actual}}{E \text{ maximum}}$$

$Z_R$ is the receiving end impedance (taken to be resistive) and $Z_0$ is the characteristic impedance of the transmission line (also taken to be resistive).

As is readily seen between two points along the curve, $Z_1$ and $Z_2$, the curve is essentially linear and accordingly, the voltage along this portion is directly proportional to resistance. This attribute of transmission lines, as will be seen shortly, is used to advantage in the apparatus 10 wherein the transistor 11 to be tested will be assumed to have an $REh_{ie}$ lying between the points $Z_1$ and $Z_2$.

In utilization of the apparatus 10 it is first necessary to calibrate it. To accomplish this at least two calibrating transistors (not shown) are employed, each of the transistors having a known $REh_{ie}$ and a known reactive part which is of the same type (capacitive) and is of approximately the same value as that of the transistor 11. The first step of the calibration entails inserting one of the calibrating transistors into the receptacle 14 in the manner indicated in FIG. 1 for the transistor 11. Advantageously, the first calibrating transistor should have an $REh_{ie}$ in the middle of the linear resistance range, i.e., it should have a value approximately equal to $$\frac{Z_1 + Z_2}{2}$$

The tuning stub 49 is moved to the right or to the left, as viewed in FIG. 1, until the voltage at the output 35 of the voltage divider 31 is at a maximum. This indicates that the standing wave produced in the transmission line 12 has a maximum at the point of connection of the readout stub 27 and, hence, at the terminal 21. It also indicates that the reactive component of $h_{ie}$ of the first calibrating transistor, as well as any stray reactance appearing at the terminal 21, has been effectively cancelled. Accordingly, the voltage at the output 35 of the voltage divider 31, is directly proportional to $REh_{ie}$ of the first calibrating transistor. The variable resistor 33 and the variable D.C. voltage source 34 are now adjusted such that the output 35 of the voltage divider 31, in millivolts, is equal numerically to the known value of $REh_{ie}$ of the first calibrating transistor in ohms. Next, the other calibrating transistor is inserted into the receptacle 14 and the variable resistor 33 and the variable voltage source 34 re-adjusted, if necessary, so that the output 35 of the voltage divider 31, in millivolts, is equal numerically to the known value of $REh_{ie}$ of the second calibrating transistor in ohms. If necessary, the foregoing steps are repeated until the output 35 of the voltage divider 31 (in millivolts) without further adjustment of the variable resistor 33 and the variable voltage source 34 is equal numerically to $REh_{ie}$ (in ohms) of the first calibrating transistor when the transmission line 12 is terminated therewith and is equal numerically to $REh_{ie}$ (in ohms) of the second calibrating transistor when the transmission line is terminated with that transistor. In the last step of the calibration, the potentiometer 41 is adjusted so that the potential of the point 39, in millivolts, is equal to an allowable upper limit value of $REh_{ie}$ of the transistor 11 in ohms. Of course, if Go-No Go testing is not desired the reference voltage can be set to ground potential, whereby the reading of the voltmeter would indicate directly the voltage at the output 35 of the voltage divider 31.

Measurement of $REh_{ie}$ of the transistor 11 is now easily effected by inserting the transistor into the receptacle 14, the "Go" lamp 46 or the "No Go" lamp 47 lighting depending upon whether $REh_{ie}$ of the transistor is less than or greater than the allowable upper limit thereof. The actual difference between $REh_{ie}$ of the transistor and the allowable upper limit value thereof is indicated directly by the voltmeter 37.

The adjustment of the tuning stub 49 actually cancels susceptance, which for a series combination of a resistor and a capacitor depends to a certain extent upon the value of the resistor. Accordingly, the susceptance value of $h_{ie}$ changes slightly for different values of $REh_{ie}$ and results in a slight shift either to the left or to the right in the maximum point of the standing wave. This slight shift, however, has little effect on the measurement because of the fact that the slope of the standing wave at a maximum is very small and, accordingly, any slight shift of the standing wave has a negligible effect on the voltage measured at the original maximum point.

The assumptions made in the foregoing description of the apparatus 10, e.g., the assumption regarding $REh_{ie}$ being substantially greater than the imaginary component of $h_{ie}$, have proven to be true in the testing of transistors, such as the Western Electric 16A. In this instance, at a frequency of .250 mc., it was found that $REh_{ie}$ varied from 60 to 190 ohms while the reactive component had a value of 5 ohms with very slight variation therefrom. In this connection, the requirement for the foregoing measurement of the real part of a complex impedance to be substantially greater than the imaginary part attaches only when series complex impedances are involved, as in the instant case. Where, however, complex parallel impedances are involved, no requirement as to relative value attaches because the reactive component can always be completely cancelled by adjustment of the tuning stub 49.

It will be appreciated by one skilled in the art that the range of resistance values encompassed by the linear portion of the curve of FIG. 2 depends upon the characteristic empedance $Z_0$ of the transmission line 12, the range of values of the linear portion increasing as the characteristic impedance increases and decreasing as the characteristic impedance decreases. Accordingly, a wide range of resistance values can be measured by proper selection of the transmission line 12.

It is to be understood that the above-described embodiments are merely illustrative of the principles of the invention. Other embodiments may be devised by persons skilled in the art which embody these principles and fall within the spirit and scope thereof.

What is claimed is:

1. The method of measuring at a high frequency the real part of a complex impedance having a known imaginary part, which comprises the steps of:
   applying a high frequency signal to a transmission line having a tuning stub connected thereto;
   terminating the transmission line successively with first and second known complex calibrating impedances and with the impedance to be measured, said first and second calibrating impedances having different real parts and having imaginary parts which are substantially equal to the imaginary part of the impedance to be measured;
   adjusting the tuning stub when one of said calibrating impedances terminates the transmission line to substantially cancel the imaginary part of said one calibrating impedance;
   applying the voltage from a point along the transmission line of maximum voltage to variable voltage changing means; and
   adjusting the voltage changing means such that when the transmission line is terminated with the first and second calibrating impedances the output thereof has a predetermined relationship to the values of the real parts of said calibrating impedance, and when the transmission line is terminated with the unknown impedance the output of said voltage changing means has the same predetermined relationship to the value of the real part of the unknown impedance.

2. The method of measuring at a high frequency the real part of $h_{ie}$ of a transistor, the imaginary part of $h_{ie}$ being known and being substantially smaller than the real part, which method comprises the steps of:
   applying a high frequency signal to a transmission line having a tuning stub connected thereto;
   terminating the transmission line successively with first and second known complex calibrating impedances and with the transistor, said first and second calibrating impedances having different real parts and having imaginary parts which are substantially equal to the imaginary part of $h_{ie}$ of the transistor;
   adjusting the tuning stub when one of said calibrating impedances terminates the transmission line to substantially cancel the imaginary part of said one calibrating impedance;
   applying the voltage from a point along the transmission line of maximum voltage to variable voltage changing means;
   suitably biasing the transistor for an $h_{ie}$ measurement when said transistor terminates the transmission line; and
   adjusting the voltage changing means such that when the transmission line is terminated with the first calibrating impedance the output of said voltage changing means in voltage units is equal numerically to the value of the real part of said first calibrating impedance in impedance units, when the transmission line is terminated with the second calibrating impedance the output of said voltage changing means in voltage units is equal numerically to the value of the real part of said second calibrating impedance in impedance units, and when the transmission line is terminated with the transistor the output of said voltage changing means in voltage units is equal numerically to the value of the real part of $h_{ie}$ of the transistor in impedance units.

3. Apparatus for the high frequency measurement of the real part of $h_{ie}$ of a transistor, which comprises:
   a transmission line;
   a source of high frequency electrical energy connected to said transmission line at one end thereof;
   a receptacle connected to the opposite end of said transmission line for receiving a transistor to be measured and for terminating the transmission line therewith;
   means for suitably biasing said transistor for $h_{ie}$ measurement;
   a readout stub connected to said transmission line at a point of maximum standing wave voltage;
   means connected to said transmission line for effectively cancelling the reactive component of said transistor;
   means for detecting voltage connected to said readout stub at substantially a point of maximum standing wave voltage; and
   voltage changing means coupled to said detecting means, said voltage changing means being adjustable to cause the output thereof to have a predetermined relationship to the value of a transistor terminating the transmission line.

4. Apparatus in accordance with claim 3 wherein the cancelling means comprises a short-circuited tuning stub of adjustable length.

5. Apparatus in accordance with claim 3 wherein the voltage changing means comprises a voltage divider, said voltage divider including a variable resistor and a variable voltage source.

6. Apparatus in accordance with claim 3 wherein said readout stub is one-half wavelength long and has one end open-circuited and the opposite end connected to the transmission line.

7. Apparatus in accordance with claim 6 wherein the detecting means includes a diode and a capacitor, the diode being connected to the readout stub at a point substantially at the open-circuited end thereof.

8. Apparatus for determining whether the real part of an impedance is greater than or less than a predetermined value, which apparatus comprises:
- a transmission line;
- a source of high frequency electrical energy connected to said transmission line at one end thereof;
- a receptacle connected to the opposite end of said transmission line for receiving an impedance to be measured and for terminating the transmission line therewith;
- a readout stub connected to said transmission line at a point of maximum standing wave voltage;
- means for detecting voltage connected to said readout stub at substantially a point of maximum standing wave voltage;
- a tuning stub connected to said readout stub intermediate the input end thereof and the detecting means;
- voltage divider means, said voltage divider means being adjustable to cause the output thereof in voltage units to be equal numerically to the real part in impedance units of an impedance terminating the transmission line;
- a source of reference voltage, said source being adjustable such that the output thereof, in voltage units, is equal numerically to the predetermined value of the real part of the unknown impedance, in impedance units; and
- means for comparing the output of the voltage divider to the output of the reference voltage source.

9. Apparatus for determining whether the real part of $h_{ie}$ of a transistor is greater than or less than a predetermined value, which apparatus comprises:
- a transmission line;
- a source of high frequency electrical energy connected to said transmission line at one end thereof;
- a receptacle connected to the opposite end of said transmission line for receiving a transistor to be measured and for terminating the transmission line therewith;
- means for suitably biasing the transistor for $h_{ie}$ measurement;
- a readout stub connected to said transmission line at a point of maximum standing wave voltage;
- means for detecting voltage connected to said readout stub at substantially a point of maximum standing wave voltage;
- a tuning stub connected to said readout stub intermediate the input end thereof and the detecting means;
- voltage divider means, said voltage divider means being adjustable to cause the output thereof in voltage units to be equal numerically to the real part in impedance units of a transistor terminating the transmission line;
- a source of reference voltage, said source being adjustable such that the output thereof, in voltage units, is equal numerically to the predetermined value of the real part of $h_{ie}$ of said transistor, in impedance units; and
- means for comparing the output of the voltage divider to the output of the reference source.

References Cited
UNITED STATES PATENTS
| | | | |
|---|---|---|---|
| 2,611,804 | 9/1952 | Zaleski | 324—95 X |
| 2,989,699 | 6/1961 | Hopfer | 324—95 |

OTHER REFERENCES
Electronics (Coffey), February 1956, pp. 152–155.

Hewlett-Packard Journal, vol. 12, No. 4, December 1960, "Improved Sweep Frequency Techniques for Broadband Microwave Testing," pp. 1–6.

RUDOLPH V. ROLINEC, *Primary Examiner.*

WALTER L. CARLSON, *Examiner.*

A. E. RICHMOND, E. L. STOLARUN,
*Assistant Examiners.*